United States Patent
Burton

(10) Patent No.: US 8,746,727 B1
(45) Date of Patent: Jun. 10, 2014

(54) UTILITY HITCH

(71) Applicant: Roger A. Burton, Rice, MN (US)

(72) Inventor: Roger A. Burton, Rice, MN (US)

(*) Notice: Subject to any disclaimer, the term of this patent is extended or adjusted under 35 U.S.C. 154(b) by 0 days.

(21) Appl. No.: 13/764,194

(22) Filed: Feb. 11, 2013

(51) Int. Cl.
B60D 1/06 (2006.01)

(52) U.S. Cl.
USPC .......................................... 280/512; 280/514

(58) Field of Classification Search
USPC .................................. 280/511, 512, 513, 514
See application file for complete search history.

(56) References Cited

U.S. PATENT DOCUMENTS

| 2,326,466 | A |   | 8/1943  | Kitterman |         |
|-----------|---|---|---------|-----------|---------|
| 2,407,464 | A |   | 9/1946  | Wilson    |         |
| 2,673,096 | A |   | 3/1954  | Bendtsen  |         |
| 3,139,291 | A |   | 6/1964  | Steve     |         |
| 3,831,982 | A |   | 8/1974  | Genzel et al. |     |
| 4,072,320 | A |   | 2/1978  | Powell    |         |
| 4,133,553 | A | * | 1/1979  | Pierce    | 280/509 |
| 4,157,190 | A | * | 6/1979  | Nyman     | 280/512 |
| 4,209,184 | A |   | 6/1980  | Byers     |         |
| 4,241,936 | A |   | 12/1980 | Carruthers et al. | |
| 4,778,196 | A | * | 10/1988 | Spoliansky | 280/512 |
| 5,344,174 | A |   | 9/1994  | Sanders   |         |
| 5,421,600 | A | * | 6/1995  | Jones et al. | 280/428 |
| 5,671,938 | A |   | 9/1997  | Olson     |         |
| 6,224,084 | B1| * | 5/2001  | Ray et al. | 280/508 |
| 7,390,008 | B1| * | 6/2008  | Hall      | 280/511 |
| 7,871,098 | B2| * | 1/2011  | Drake et al. | 280/512 |

* cited by examiner

Primary Examiner — Tony Winner
(74) Attorney, Agent, or Firm — Albert W. Watkins

(57) ABSTRACT

A utility hitch provides a shaft defining a longitudinal axis. A socket is affixed to the shaft and at least partially receives a ball. A slide lock coupled with the shaft is translatable parallel with the shaft longitudinal axis. A tongue protrudes from the slide lock. The tongue secures the ball into the socket by engaging the ball at a bottom surface, and alternatively releases the tongue from the ball bottom surface to enable the ball to release from the socket. Retracting pins protrude from the shaft to retain the slide lock and tongue in a first position immediately adjacent to the ball, and are operative to retract inside the shaft and slide lock when the slide lock is translated to a second position distal to the ball, to permit the slide lock to translate or reciprocate relative to the shaft. Wings may be provided to facilitate actuation of the retracting pins.

16 Claims, 3 Drawing Sheets

UTILITY HITCH

BACKGROUND OF THE INVENTION

1. Field of the Invention

The present invention pertains generally to wheeled and articulated land vehicles, and more particularly to ball and socket couplings such as may be provided between a towing vehicle and a trailer.

2. Description of the Related Art

Since the advent of mechanized transportation, people have sought better ways to transport matter of nearly all compositions and shapes. In addition to transporting an individual or group of people, there also exists a need for transporting various non-human cargo. In modern times, motor vehicles have provided both human transport and also a motive power source for transporting cargo.

In many cases, the motor vehicle and cargo transport are produced as separable wheeled vehicles. This permits the relatively expensive motor vehicle to be used with or without a particular trailer, thereby allowing the motor vehicle to be used for many diverse purposes. For exemplary purposes only, and not solely limiting thereto, one motor vehicle may be coupled to and detached from at least one trailer. Where a plurality of trailers are available, the motor vehicle may act as the motive power source for only one trailer at a time, or may alternatively be coupled with more than one trailer, such as by linking one trailer to another in the manner of train cars. Where only one trailer is coupled with at a time, any additional trailers may either be stored, or may be parked at suitable location for loading and unloading. These additional trailers may be identical to the first trailer and each other, or may alternatively be different and unique with respect to each other. For exemplary purposes only, one type of trailer may be used to transport heavy loads such as rock and sand, while another very diverse trailer may be used to collect and transport grass clippings and leaves.

Where the trailer is separable from the motor vehicle, both vehicles will ordinarily be provided with at least one wheel set. Separate wheel sets permit the motor vehicle and trailer to each move independently of the other, and so be moved about or retrieved at will. In other words, when desired, a motor vehicle may be disconnected from the trailer to thereby leave the trailer parked, while the motor vehicle continues to travel.

The separate wheel set also allows disparate motion between motor vehicle and trailer, to better accommodate irregularities in the roadway, such as but not limited to potholes. If the two vehicles are not permitted to move at least to some extent independently of each other, there can be enormous damaging forces applied to the coupling between vehicle and trailer. As a result, many modern vehicles have couplings that permit the trailer to articulate relative to the motor vehicle.

One particularly popular coupling is the ball and socket, also referred to as a ball and hitch. One vehicle, commonly the motor vehicle, is equipped with a ball, typically mounted atop a short post. The other vehicle, typically the trailer, is provided with a socket and a way to secure the socket to the ball. Preferably, the socket only encompasses a portion of the ball and is thereby free to rotate not only about a vertical axis through the ball post, but also about a horizontal axis generally parallel to the trailer tongue. Rotation about a vertical axis permits the two vehicles to turn a corner, while rotation about the horizontal axis accommodates road surface irregularities such as potholes.

Through the ages, people have recognized the need for safe transportation. Modern laws and regulations require particular features for a vehicle to be permitted to access public roadways. These laws and regulations, and also various customary requirements and apparatus, have created quite safe roadways that carry millions of vehicles through billions of miles each year.

To ensure safety, roadway approved hitches have various apparatus that not only couple with the ball, but that also can secure the hitch to the ball. These safety hitches tend to be undesirably complex, bulky, heavy, and undesirably expensive to fabricate. As a result, these hitches are not generally used with lighter duty lawn and garden equipment, with All-Terrain Vehicles (ATVs), for light agricultural purposes, or with other similar off-road vehicle and trailer combinations. Instead, most of these lighter applications rely upon a clevis pin that passes through a hole in a trailer tongue. The trailer tongue hole is typically of significantly larger inside diameter than the outside diameter of the clevis pin, which is necessary to enable rotation about more than just a vertical axis.

Unfortunately, the use of a pin passing through an oversized hole means that there is undesirable play between trailer tongue and clevis pin. This means that changes in relative velocity between towing and trailing vehicle will result in poorly restrained movement between the two vehicles. This can be in the form of "slamming" when the towing vehicle either tries to accelerate or decelerate, or even during cornering. In addition to the unpleasant noise, there is also the potential for significant wear and damage to both the trailer tongue and the clevis pin at the point of engagement there between. Further, the rather continuous noise produced by the impacts between trailer tongue and clevis pin can mask more serious sounds that should demand the immediate attention of the vehicle operator or a suitably trained person.

Exemplary U.S. patents that illustrate various hitches and couplings, the teachings and contents which are incorporated herein by reference, include U.S. Pat. No. 2,326,466 by Kitterman, entitled "Trailer Coupler"; U.S. Pat. No. 2,407,464 by Wilson, entitled "Trailer Hitch"; U.S. Pat. No. 3,139,291 by Geresy, entitled "Trailer Hitch Locking Device"; U.S. Pat. No. 3,831,982 by Bernhardt et al, entitled "Universal Coupling"; U.S. Pat. No. 4,072,320 by Powell, entitled "Coupling Element for Trailer Hitches"; U.S. Pat. No. 4,209,184 by Byers, entitled "Self-locking Trailer Hitch Assembly"; U.S. Pat. No. 4,241,936 by Carruthers et al, entitled "Trailer Couplings"; U.S. Pat. No. 5,344,174 by Sanders, entitled "Trailer Coupling with Friction Damper"; and U.S. Pat. No. 5,671,938 by Olson, entitled "Implement Hitch".

Another patent, illustrating a different coupling technique using a cam apparatus, is shown in U.S. Pat. No. 2,673,096 by Bendtsen, entitled "Hitch Mechanism", the teachings and contents which are incorporated herein by reference. In addition to the aforementioned patents, Webster's New Universal Unabridged Dictionary, Second Edition copyright 1983, is incorporated herein by reference in entirety for the definitions of words and terms used herein.

SUMMARY OF THE INVENTION

In a first manifestation, the invention is, in combination, a towing vehicle, a towed vehicle, and an articulating coupling operatively securing the towed vehicle to towing vehicle. The articulating coupling comprises a ball protruding from a first one of the towed and towing vehicles. A shaft extends from a second one of the towed and towing vehicles different from the first one of the towed and towing vehicles, the shaft defining a longitudinal axis. A socket is affixed to the shaft and is operative to at least partially receive and cover a top surface of the protruding ball. A slide lock having a body coupled with and mechanically supported by the shaft is translatable along and in a direction of travel parallel with the shaft longitudinal axis. A tongue protrudes from the body on a first side of the slide lock. The tongue is operative when the socket engages the ball and the slide lock body is operatively translated to a first position immediately adjacent to the ball to secure the ball into the socket by the tongue engaging the ball at a bottom surface distal to the ball top surface and operative when the slide lock body is operatively translated to a second position distal from the ball to release the tongue from the ball bottom surface and thereby enable the ball to release from the socket by displacement of the socket from the top surface of the ball.

In a second manifestation, the invention is in combination, a towing vehicle having a protruding trailer ball and a towed vehicle having a protruding shaft defining a longitudinal axis and terminating at a trailer ball socket. The trailer ball socket has an opening operative to at least partially receive the protruding trailer ball therein. The improvement comprises a slide lock translatable along the protruding shaft in a direction parallel to the longitudinal axis from a first end operatively engaged with the protruding trailer ball and at least partially closing the trailer ball socket opening to a second end distal from the first end operatively disengaged from the protruding trailer ball and removed from the trailer ball socket opening.

In a third manifestation, the invention is a towed vehicle. The towed vehicle comprises a protruding shaft defining a longitudinal axis and terminating at a trailer ball socket. Tubing encompasses the protruding shaft and reciprocates along the protruding shaft in a direction parallel to the longitudinal axis from a first end at least partially closing the trailer ball socket opening to a second end distal from the first end operatively removed from the trailer ball socket opening.

OBJECTS OF THE INVENTION

Exemplary embodiments of the present invention solve inadequacies of the prior art by providing a slide lock that encompasses a trailer tongue and reciprocates along the tongue from a first end at least partially closing the trailer ball socket opening to a second end distal from the first end where the tubing is operatively removed from the trailer ball socket opening. Various retracting and locking pins are preferably provided, and wings and flanges that assist with the operation are further contemplated.

A first object of the invention is to facilitate one-handed manual engagement and disengagement of the preferred articulating coupling. A second object of the invention is to provide an articulated coupling that may be used to retrofit existing pin-style articulated couplings, permitting conversion to ball and socket couplings. Another object of the present invention is to provide a socket that may be connected with a ball easily, and which may be quickly locked into coupling connection while still permitting relative movement between socket and ball about several axes. A further object of the invention is to preferably fabricate from readily available stock materials.

BRIEF DESCRIPTION OF THE DRAWINGS

The foregoing and other objects, advantages, and novel features of the present invention can be understood and appreciated by reference to the following detailed description of the invention, taken in conjunction with the accompanying drawings, in which.

DESCRIPTION OF THE PREFERRED EMBODIMENT

Figure 1:
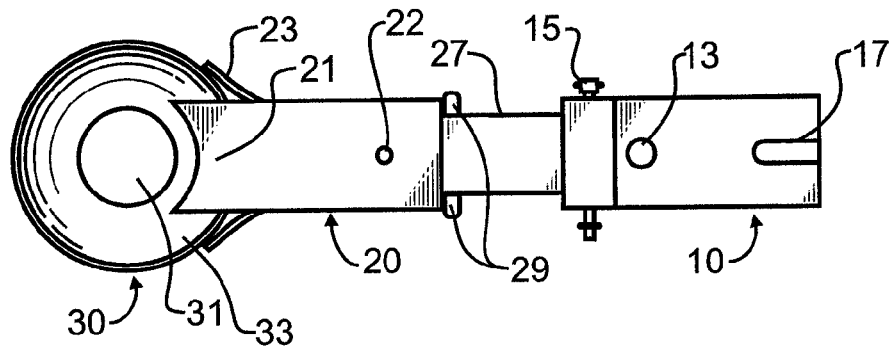
FIG. 1 illustrates a preferred embodiment utility hitch designed in accord with the teachings of the present invention from a bottom plan view.
Figure 2:
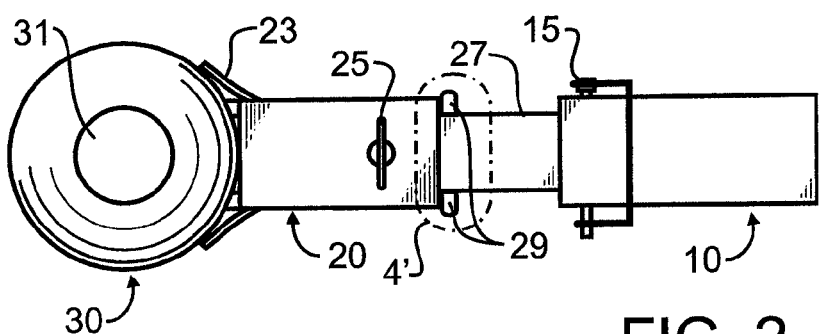
FIG. 2 illustrates the preferred embodiment utility hitch of FIG. 1 from a top plan view.
Figure 3:
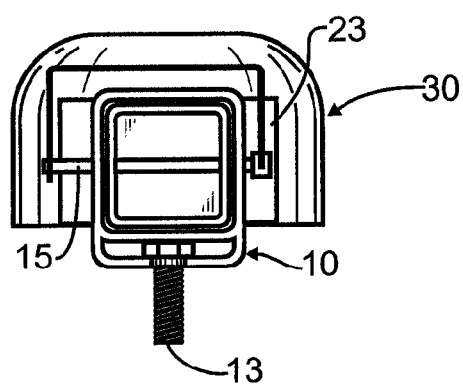
FIG. 3 illustrates the preferred embodiment utility hitch of FIG. 1 from a side elevational view.

Manifested in the preferred embodiment, the present invention provides an articulating coupling operatively securing a towed vehicle to a towing vehicle. A ball 1 as is known in the prior art will ordinarily protrude from a towing vehicle. A shaft 27 will ordinarily extend from a towed vehicle and may most commonly be referred to as a trailer tongue. A socket 30 is customarily affixed to shaft 27, and is operative to at least partially receive and cover a top surface of protruding ball 1. While not essential to the present invention, socket 30 may have a wall 33 that is cylindrical at a lower surface, and rises to a domed top that may terminate in an opening 31.

In the preferred embodiment, a trailer tongue coupler 10 may optionally be provided that has a threaded rod 13 that may for exemplary purposes pass into a hole on a prior art trailer tongue, such as a hole that might be used with a clevis pin or for other purpose. Threaded rod 13 will most preferably be affixed with a locking nut or other suitable fastener to the trailer tongue. A slot 17 is preferably provided to accommodate other bolts, fasteners, or other obstacles as may exist on the trailer tongue. A tubular body 11 acts as a receiver for shaft 27, which is preferably secured to body 11 using a locking pin or hasp 15. Trailer tongue coupler 10 is not necessary for the operation of the remaining components, but is preferred to facilitate coupling to a wide variety of prior art trailers.

Figure 6:
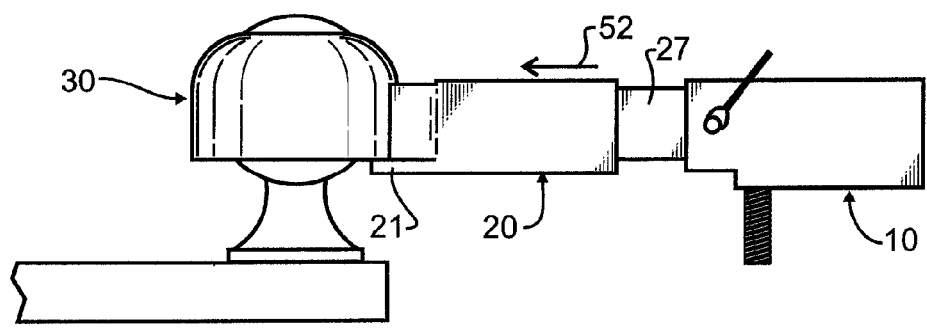

Reciprocating longitudinally along shaft 27 is slide lock 20 that has a tubular body such as might be fabricated from square or rectangular tubing. Slide lock 20 is preferably coupled with and mechanically supported by shaft 27. In the preferred embodiment, this is accomplished by the tubular body fully encompassing shaft 27, which provides a combination of simple manufacture and excellent strength and reliability. Nevertheless, it is contemplated herein that slide lock 20 may be affixed in any suitable reciprocating manner, including but not limited to a partial wrap, such as about 3 and one-half sides, or through any of the various slide bearings and other such structures known in the mechanical arts. Critical to proper operation is that slide lock 20 be translatable along and in a direction of travel parallel with the longitudinal axis of shaft 27, as illustrated by arrow 52 in FIG. 6. Most preferably, slide lock 20 has a protruding tongue 21. In the preferred embodiment, tongue 21 is simply an extension of one face of the square tubing used to manufacture slide lock 20.

Figure 5:
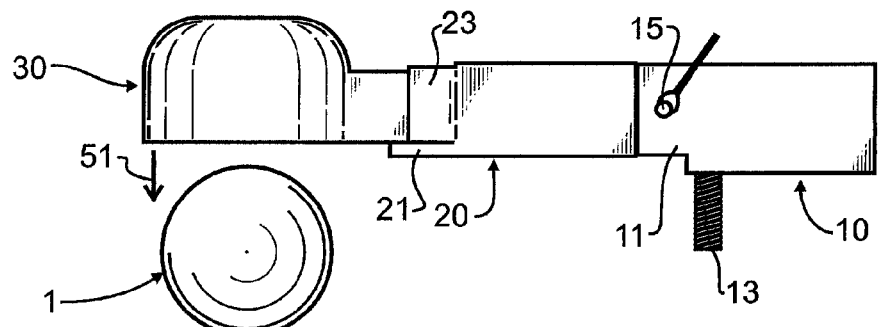
FIGS. 5-7 illustrate the preferred embodiment utility hitch of FIG. 1 from a front elevational view and in further combination with a trailer ball, showing the coupling sequence with FIG. 5 illustrating the hitch disconnected from ball, FIG. 6 illustrating the hitch and ball coupled but not locked, and FIG. 7 illustrating the hitch and ball coupled and locked.
Figure 7:
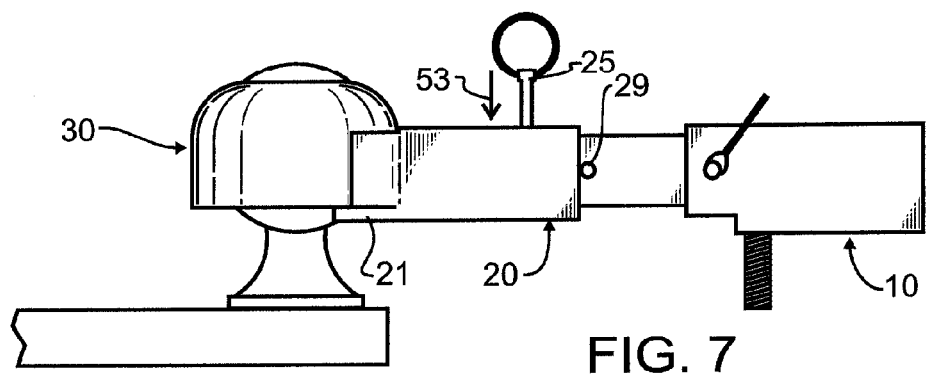

Tongue 21 only becomes operative after socket 30 is moved as shown by movement arrow 51 in FIG. 5 to engage ball 1. Movement arrow 51 shows the direction of movement of socket 30 relative to ball 1 to perform the initial engagement there between. Next, slide lock 20 is operatively translated to a first position immediately adjacent to ball 1 as illustrated by movement arrow 52 in FIG. 6 to lock ball 1 into socket 30. This is accomplished in the preferred embodiment by tongue 21 engaging ball 1 at a bottom surface distal to the top surface as illustrated in FIG. 7. This position may be further secured by insertion of a locking pin 25 in the direction illustrated by movement arrow 53 through hole 22. When slide lock 20 is operatively translated back to a second position distal from ball 1, as illustrated in FIG. 5, slide lock 20 will release tongue 21 from ball 1 bottom surface and thereby enable ball 1 to release from socket 30 by displacement of socket 30 from ball 1.

Figure 4:
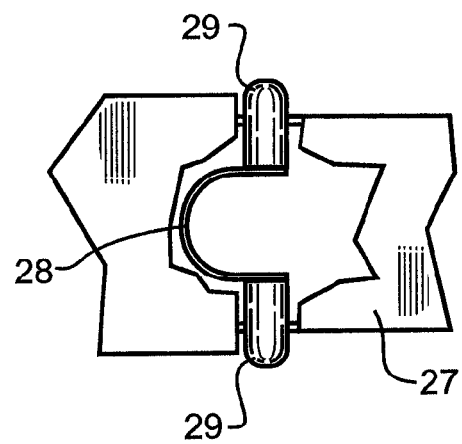
FIG. 4 illustrates a preferred embodiment retracting pin and spring combination used within the preferred embodiment utility hitch of FIG. 1 from an enlarged and sectional view taken along line 4' of FIG. 2.

One or more retracting pins 29 are preferably provided that are operative to protrude from shaft 27 beyond slide lock 20, when slide lock 20 is translated to the first position immediately adjacent to ball 1 illustrated in FIG. 7. Pins 29 thereby retain slide lock 20 in this first locked position immediately adjacent to ball 1. Pins 29 are also preferably operative to retract inside shaft 27 and slide lock 20 when slide lock 20 is translated to the second position illustrated in FIG. 5 that is distal to ball 1. Preferably, and as illustrated in FIG. 4, a pair of opposed retracting pins 29 are coupled together through a common spring 28 that is generally "U"-shaped, though any suitable spring or other resilient mechanism or retracting pin equivalent may be substituted therefor.

Figure 8:
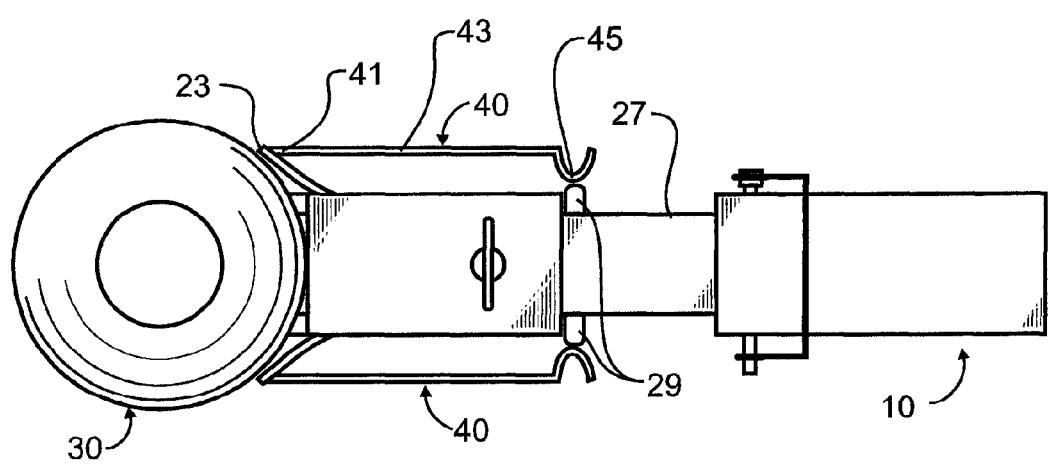
FIG. 8 illustrates a first alternative embodiment utility hitch designed in accord with the teachings of the present invention from a top plan view.

One and preferably a pair of resilient wings 40 as illustrated in FIG. 8 may optionally be supported by slide lock 20 at a first anchor point 41. The method of fastening of wings 40 to slide lock 20 is not critical to the present invention, and will depend upon the choice of materials. In the preferred embodiment, metals are used and so spot welds and rivets are preferred methods for attachment, though many different fasteners including mechanical and adhesive fasteners may be used as is known in the mechanical arts. Wings 40 extend from anchor point 41 away from slide lock 20 and are spaced from slide lock 20 at a first pin gap 43. Wings 40 are most preferably resiliently manually deformable. This permits them to flex and contact and retract retracting pins 29 at contact point 45 simply by squeezing wings 40. As may be appreciated, this is a simpler manual process than directly pressing pins 29 into shaft 27. In this alternative embodiment, contact point 45 is sharply curved to gain rigidity and enable full pin retraction.

Flanges 23 may also optionally be provided extending from slide lock 20. If so provided, flanges 23 may operatively engage with socket 30 when slide lock 20 is translated to the first position immediately adjacent to ball 1. These flanges may comprise extensions of ones of sides of the square or rectangular tubing used to fabricate slide lock 20. The flanges also provide one optional anchor point 41 for wings 40.

The preferred and alternative embodiment utility hitches designed in accord with the teachings of the present invention may be manufactured from a variety of materials, including metals, resins and plastics, ceramics or cementitious materials, or even combinations, laminates or composites of the above. The specific material used may vary, though special benefits are attainable if several important factors are taken into consideration. Firstly, the apparatus will preferably be sufficiently strong to support a desired tow load in normal use. Most preferably, the preferred embodiment will also be weather resistant and sufficiently durable to withstand the particular climate for the intended application, including any forces that may be applied that could tend to fracture or shear any components used therein. In the preferred embodiment, ordinary carbon steel may be powder coated, dip coated, painted, or otherwise treated. More expensive metal alloys may, of course, also be used, but cost will be of consideration. Metal alloys will include all metal alloys that are suitable, with aluminum and stainless steel being merely exemplary.

While the foregoing details what is felt to be the preferred embodiment of the invention, no material limitations to the scope of the claimed invention are intended. Further, features and design alternatives that would be obvious to one of ordinary skill in the art are considered to be incorporated herein. The scope of the invention is set forth and particularly described in the claims hereinbelow.

I claim:

1. In combination, a towing vehicle, a towed vehicle, and an articulating coupling operatively securing said towed vehicle to said towing vehicle, said articulating coupling comprising:
   a ball protruding from a first one of said towed and towing vehicles;
   a shaft extending from a second one of said towed and towing vehicles different from said first one of said towed and towing vehicles, said shaft defining a longitudinal axis;
   a socket affixed to said shaft operative to at least partially receive and cover a top surface of said protruding ball;
   a slide lock having a body coupled with and mechanically supported by said shaft and translatable along and in a direction of travel parallel with said shaft longitudinal axis and a tongue protruding from said body on a first side of said slide lock, said tongue operative when said socket engages said ball and said slide lock body is operatively translated to a first position immediately adjacent to said ball to secure said ball into said socket by said tongue engaging said ball at a bottom surface distal to said top surface and operative when said slide lock body is operatively translated to a second position distal from said ball to release said tongue from said ball bottom surface and thereby enable said ball to release from said socket by displacement of said socket from said top surface of said ball; and
   at least one retracting pin operative to protrude from said shaft beyond said slide lock body when said slide lock is translated to said first position immediately adjacent to said ball and thereby retain said slide lock in said first position immediately adjacent to said ball, and operative to retract inside said shaft and said slide lock body when said slide lock is translated to said second position distal to said ball and thereby permit said slide lock to translate relative to said shaft.

2. The combination towing vehicle, towed vehicle, and articulating coupling of claim 1, wherein said ball protrudes from said towing vehicle and said shaft extends from said towed vehicle.

3. The combination towing vehicle, towed vehicle, and articulating coupling of claim 1, wherein said at least one retracting pin further comprises a pair of opposed pins coupled together through a common spring.

4. The combination towing vehicle, towed vehicle, and articulating coupling of claim 3, wherein said common spring is generally "U"-shaped and at a first end terminates with a first one of said pair of opposed pins and at a second end distal to said first end terminates with a second one of said pair of opposed pins.

5. The combination towing vehicle, towed vehicle, and articulating coupling of claim 1, further comprising at least one resilient wing supported by said slide lock at a first anchor and spaced from said slide lock at a first pin gap distal to said first anchor, said at least one resilient wing resiliently manually deformable to contact and retract said at least one retracting pin into said shaft.

6. The combination towing vehicle, towed vehicle, and articulating coupling of claim 5, wherein said at least one retracting pin further comprises first and second opposed pins coupled together through a common spring, and said at least one resilient wing further comprises first and second opposed wings, said first resilient wing resiliently manually deformable to contact and retract said first retracting pin into said shaft, and said second resilient wing resiliently manually deformable to contact and retract said second retracting pin into said shaft.

7. In combination, a towing vehicle having a protruding trailer ball and a towed vehicle having a protruding shaft defining a longitudinal axis and terminating at a first end adjacent a trailer ball socket, said trailer ball socket having an opening operative to at least partially receive said protruding trailer ball therein, wherein the improvement comprises a slide lock translatable along said protruding shaft in a direction parallel to said longitudinal axis from said first end where said slide lock is operatively engaged with said protruding trailer ball and at least partially closing said trailer ball socket opening to a second end of said protruding shaft distal from said first end where said slide lock is operatively disengaged from said protruding trailer ball and removed from said trailer ball socket opening, and further comprises at least one retracting pin operative to protrude from said shaft beyond said slide lock when said slide lock is translated to said first end and thereby retain said slide lock adjacent said first end, and operative to retract inside said shaft and said slide lock when said slide lock is translated to said second end and thereby permit said slide lock to translate relative to said shaft.

8. A towed vehicle, comprising:
   a protruding shaft defining a longitudinal axis and terminating at a trailer ball socket;
   a tubing encompassing said protruding shaft and reciprocating along said protruding shaft in a direction parallel to said longitudinal axis from a first end of said protruding shaft at least partially closing said trailer ball socket opening to a second end of said protruding shaft distal from said first end operatively removed from said trailer ball socket opening; and
   at least one retracting pin operative to protrude from said shaft beyond said tubing when said tubing is translated to said first end and thereby retain said tubing adjacent said first end, and operative to retract inside said shaft and said tubing when said tubing is translated to said second end and thereby permit said tubing to reciprocate relative to said shaft.

9. The towed vehicle of claim 8, further comprising at least one resilient wing supported by said tubing at a first anchor and spaced from said tubing at a first pin gap distal to said first anchor, said at least one resilient wing resiliently manually deformable to contact and retract said at least one retracting pin into said shaft.

10. In combination, a towing vehicle, a towed vehicle, and an articulating coupling operatively securing said towed vehicle to said towing vehicle, said articulating coupling comprising:
   a ball protruding from a first one of said towed and towing vehicles;
   a shaft extending from a second one of said towed and towing vehicles different from said first one of said towed and towing vehicles, said shaft defining a longitudinal axis;
   a socket affixed to said shaft operative to at least partially receive and cover a top surface of said protruding ball;
   a slide lock having a body coupled with, fully circumscribing and mechanically supported by said shaft and translatable along and in a direction of travel parallel with said shaft longitudinal axis and a tongue protruding from said body on a first side of said slide lock, said tongue operative when said socket engages said ball and said slide lock body is operatively translated to a first position immediately adjacent to said ball to secure said ball into said socket by said tongue engaging said ball at a bottom surface distal to said top surface and operative when said slide lock body is operatively translated to a second position distal from said ball to release said tongue from said ball bottom surface and thereby enable said ball to release from said socket by displacement of said socket from said top surface of said ball.

11. The combination towing vehicle, towed vehicle, and articulating coupling of claim 10, wherein said shaft further comprises a rectangular exterior cross-section and said slide lock further comprises a tubing having a rectangular interior cross-section of slightly larger inside dimension than an outside dimension of said shaft rectangular exterior cross-section.

12. The combination towing vehicle, towed vehicle, and articulating coupling of claim 11, wherein said tongue further comprises an extension of a first side of said tubing.

13. The combination towing vehicle, towed vehicle, and articulating coupling of claim 12, further comprising first and second flanges operatively engaging with said socket when said slide lock is translated to said first position immediately adjacent to said ball.

14. The combination towing vehicle, towed vehicle, and articulating coupling of claim 13, wherein said first flange further comprises an extension of a second side of said rectangular tubing and second flange further comprises an extension of a third side of said rectangular tubing.

15. The combination towing vehicle, towed vehicle, and articulating coupling of claim 13, further comprising a first resilient wing affixed at a first anchor to said first flange and spaced from said slide lock at a first pin gap distal to said first anchor, said first resilient wing resiliently manually deformable to contact said first retracting pin at a contact point on said first resilient wing that is distal to said first anchor, and to thereby operatively retract said first retracting pin into said shaft.

16. In combination, a towing vehicle, a towed vehicle, and an articulating coupling operatively securing said towed vehicle to said towing vehicle, said articulating coupling comprising:
   a ball protruding from a first one of said towed and towing vehicles;
   a shaft extending from a second one of said towed and towing vehicles different from said first one of said towed and towing vehicles, said shaft defining a longitudinal axis;
   a socket affixed to said shaft operative to at least partially receive and cover a top surface of said protruding ball;
   a slide lock having a body coupled with and mechanically supported by said shaft and translatable along and in a direction of travel parallel with said shaft longitudinal axis and a tongue protruding from said body on a first side of said slide lock, said tongue operative when said socket engages said ball and said slide lock body is operatively translated to a first position immediately adjacent to said ball to secure said ball into said socket by said tongue engaging said ball at a bottom surface distal to said top surface and operative when said slide lock body is operatively translated to a second position distal from said ball to release said tongue from said ball bottom surface and thereby enable said ball to release from said socket by displacement of said socket from said top surface of said ball; and a hole passing co-axially through said slide lock body and said shaft when said slide lock is translated to said first position immediately adjacent to said ball, said hole operative to receive a locking pin therein to secure said slide lock in said first position immediately adjacent to said ball.

\* \* \* \* \*